United States Patent [19]

Glasgow

[11] Patent Number: 5,814,213

[45] Date of Patent: Sep. 29, 1998

[54] SKIMMING APPARATUS

[76] Inventor: James A. Glasgow, 7481 N. Timberline Dr., Cincinnati, Ohio 45243

[21] Appl. No.: 967,574

[22] Filed: Nov. 10, 1997

[51] Int. Cl.[6] .................................................. B01D 21/24
[52] U.S. Cl. ......................... 210/104; 210/128; 210/232; 210/242.3; 210/122; 137/264; 137/389; 137/423; 137/409; 137/571
[58] Field of Search ............................... 210/123, 128–9, 210/242.1, 242.3, 242.4, 776, 122, 232, 104; 137/409, 264, 571, 423, 389

[56] References Cited

U.S. PATENT DOCUMENTS

| 554,815 | 2/1896 | Field . |
| 1,164,527 | 12/1915 | Kelly, Jr. . |
| 1,200,951 | 10/1916 | Kelly, Jr. . |

(List continued on next page.)

FOREIGN PATENT DOCUMENTS

| 0 415 121 A1 | 3/1991 | European Pat. Off. . |
| 2426288 | 12/1979 | France . |
| 1484845 | 9/1969 | Germany . |

OTHER PUBLICATIONS

CLC Lubricants, *Li'l Tramp Skimmer/Aerator*.
Douglas Engineering, *SKIM–PAK Pump Systems*.
Douglas Engineering Coolant Recycling Systems, *Skim–Pak Skimmers and Tramp Oil Separators*.
Dyna Tech Chemical Specialties, Inc., *The Coolant Manager*.
E&K Sales, Inc., Carol Company, *Tramp Oil Disc Skimmer*.
Ebbco Inc., *TechSketch Oily Water Separator With Pumpp & Skimmer*.
ENERPAC Hydraulic Technology Worldwide, *Turbo Air Pump*, Modern Machine Shop advertisement.
Facet International, *Engineering Clear Solutions for Environment Clean–up—Coalesing Plate Separators: MAS Series* .

Master Products, *Master Oil Skimmer*, Modern Machine Shop advertisement.
PhaSep—Phase Separation Systems, *Parallel Plate Coalescing Systems for Phase Separation*, 1987.
Ransohoff, Pro–Save, *Decant Tank*.
Rising Sump Skimmers, *Skimmers*, brochure with copy of two photographs.
Ruddux Corporation, *Ruddux Coolant System*.

(List continued on next page.)

*Primary Examiner*—Jay H. Woo
*Assistant Examiner*—Fred Prince
*Attorney, Agent, or Firm*—Wood, Herron & Evans, L.L.P.

[57] ABSTRACT

An improved skimming apparatus for skimming a two component liquid includes a housing mounted to a tank below the normal liquid level for the tank, an outlet for pumping fluid from the submerged housing and an intake structure extending upwardly from the submerged housing and defining an inlet for permitting inflow of liquid to the interior of the submerged housing. The intake structure includes an intake tube rotatably mounted to the housing at upper and lower ends. The intake tube rotates in response to variations of the liquid level in the housing, to vary the inlet size and hence the rate of inflow to the housing. An adjuster provides control over the variation of the inlet size, to accommodate different skimming rates for liquids of different temperatures. An intermediate tube surrounds the intake tube, and an outer tube surrounds the intermediate tube. Aligned slots in the intake tube, the intermediate tube, and the outer tube define the inlet, and the inlet moves vertically with vertical movement of an external float and the outer tube secured thereto. The intermediate tube slot is shaped helically and rotatably cams with vertical movement of the float and outer tube, to maintain the same cross-sectional shape for the inlet despite variations in the liquid level in the tank, and for a wide range of liquid levels in the tank. A breather tube extends from the housing to atmosphere, to permit escape of entrapped air from the housing. These features enhance the durability and versatility of this improved skimming apparatus.

17 Claims, 6 Drawing Sheets

U.S. PATENT DOCUMENTS

| | | |
|---|---|---|
| 1,672,583 | 6/1928 | Travers . |
| 2,004,423 | 6/1935 | Warren ................................. 210/104 |
| 2,181,684 | 11/1939 | Walker . |
| 2,585,878 | 2/1952 | Tryon . |
| 2,747,736 | 5/1956 | Mobley . |
| 3,303,932 | 2/1967 | Hirs et al. . |
| 3,590,584 | 7/1971 | Fitzgerald ............................. 405/63 |
| 3,688,909 | 9/1972 | Titus et al. . |
| 3,849,308 | 11/1974 | Westerman . |
| 3,849,311 | 11/1974 | Jakubek . |
| 3,923,661 | 12/1975 | Crisafulli . |
| 3,933,654 | 1/1976 | Middlebeek . |
| 3,951,810 | 4/1976 | Crisafulli . |
| 3,953,332 | 4/1976 | Speth et al. . |
| 3,970,556 | 7/1976 | Gore . |
| 4,011,158 | 3/1977 | Cook ..................................... 252/322 |
| 4,024,063 | 5/1977 | Mori . |
| 4,064,054 | 12/1977 | Anderson et al. . |
| 4,084,796 | 4/1978 | Krehbiel .............................. 366/137 |
| 4,122,016 | 10/1978 | Tao et al. . |
| 4,123,365 | 10/1978 | Middlebeek . |
| 4,132,645 | 1/1979 | Bottomley et al. . |
| 4,132,651 | 1/1979 | deJong . |
| 4,224,162 | 9/1980 | Ayroldi . |
| 4,257,895 | 3/1981 | Murdock . |
| 4,265,759 | 5/1981 | Verpalen et al. . |
| 4,301,008 | 11/1981 | Baffert et al. . |
| 4,391,707 | 7/1983 | Gordon ............................... 210/242.3 |
| 4,400,274 | 8/1983 | Protos . |
| 4,405,458 | 9/1983 | McHugh, Jr. . |
| 4,554,074 | 11/1985 | Broughton . |
| 4,636,320 | 1/1987 | Figiel et al. . |
| 4,728,440 | 3/1988 | van Kuijeren . |
| 4,746,424 | 5/1988 | Drew . |
| 4,755,292 | 7/1988 | Merriam . |
| 4,769,131 | 9/1988 | Noll et al. . |
| 4,797,210 | 1/1989 | Lonardo . |
| 4,842,306 | 6/1989 | Zeidler et al. ...................... 285/104 |
| 4,867,872 | 9/1989 | Russell et al. . |
| 4,892,666 | 1/1990 | Paulson . |
| 4,956,100 | 9/1990 | Mikkleson . |
| 5,030,342 | 7/1991 | Ortega . |
| 5,053,145 | 10/1991 | Ellison . |
| 5,059,312 | 10/1991 | Galletti . |
| 5,066,407 | 11/1991 | Furlow . |
| 5,154,835 | 10/1992 | DeMichael . |
| 5,160,605 | 11/1992 | Noestheden . |
| 5,167,815 | 12/1992 | Bachmann et al. . |
| 5,378,376 | 1/1995 | Zenner . |
| 5,397,472 | 3/1995 | Bouchard . |
| 5,451,330 | 9/1995 | Garrett . |
| 5,601,705 | 2/1997 | Glasgow ............................. 210/122 |

OTHER PUBLICATIONS

Virginia Panel/Mori Seiki, *Conventional Oil Skimming Techniques, Picture from Virginia Panel/Mori Seiki*.

Wastewater Engineers, Inc., *Background Information and Brochure*.

Wayne Products, Inc., *Skinni–Mini*, Drum Oil Skimmer

Zebra Skimmers, *Big Dipper Disk Oil Lifter, Cost Savings Calculations for the Big Dipper vs. Conventional Oil Skimming Techniques*, product flier.

Zebra Skimmers, *Big Dipper—Disk Oil Lifter*, Modern Machine Shop advertisement.

SKIMMING APPARATUS

FIELD OF THE INVENTION

This invention relates to an apparatus for removing tramp oil from aqueous solutions used as coolants in machining operations and those used as cleaning fluids for washing metal parts.

BACKGROUND OF THE INVENTION

Applicant's U.S. Pat. No. 5,601,705 entitled "SKIMMER/COALESCER SYSTEM FOR REMOVING AND SEPARATING TRAMP OIL FROM AN AQUAEOUS COOLANT," issued on Feb. 11, 1997, describes and claims a skimming/coalescer system which advantageously skims tramp oil from an aqueous coolant used in association with a machine tool. This patent is expressly incorporated by reference herein in its entirety.

Generally, the skimmer described in the '705 patent includes a substantially enclosed, submerged housing mounted below the normal operating liquid level of a liquid holding tank, such as a coolant tank for a machine tool. The skimmer includes an outlet for continuously removing skimmed liquid from the submerged housing to a coalescer, via pumping action, for separation of the tramp oil from the coolant, and return of the coolant to the tank. An intake structure includes a variable flow intake located above the housing, the intake including an external float which moves vertically to accommodate variations in the liquid level in the tank, so that skimming always occurs near the surface. The housing includes an internal mechanical sensor for determining the level of the skimmed liquid contained within the submerged housing, and this mechanical sensor controls the rate of skimming inflow at the intake, so that the skimming rate is adjusted to compensate for fluctuations in outflow from the submerged housing via the outlet. The primary objective is to assure that liquid, not air, is pumped to the coalescer via the outlet.

The skimming apparatus as described in the '705 patent represents a substantial improvement over other prior art skimming devices, such as disk or belt skimmers and floating tube and weir-type skimmers. Nevertheless, it is generally an object of this invention to improve upon the advantageous features of the skimming apparatus described in applicant's '705 patent, particularly features related to the durability and versatility.

SUMMARY OF THE INVENTION

The present invention achieves the above-stated objectives by incorporating a number of structural features into a skimming apparatus similar to the type disclosed in the '705 patent, but without departing from the general scope of the skimming apparatus described and claimed therein. More specifically, the present invention uses a three component intake structure, including an intake tube, an intermediate tube and an outer tube, thereby to provide an improved degree of control with respect to liquid flow into the inlet of the intake structure, and to enable skimming to occur over a larger range of liquid levels.

As in the '705 patent, the vertical movement of the outer tube and an external float secured thereto vertically moves the inlet to assure that skimming occurs adjacent the surface of liquid in the tank. Also, as in the '705 patent, rotation of the intake tube relative to the other portions of the intake structure, i.e., in this case the intermediate tube and the outer tube, determines the size of the inlet, thereby to control the flow rate of liquid into the housing. The intake tube is rotatably connected to the housing at both at its upper and its lower ends, for enhanced stability. At its lower end, the intake tube connects to the housing via a fluid-tight elastomeric sleeve which is rendered fluid-tight via securement of bands at upper and lower ends of the sleeve. This sleeve connection permits rotation of the intake tube relative to the housing, but prevents ingress of particulate. Stated another way, with this improved skimmer rotation of the intake tube is significantly less likely to be adversely effected by particulate build-up.

Additionally, slots formed in the intake tube, the intermediate tube, and the outer tube are shaped and oriented so that vertical movement of the external float does not change the cross-sectional shape of the inlet through which liquid flows to the interior of the submerged housing. This is accomplished via an elongated vertical slot in the intake tube, an elongated but helically oriented slot in the intermediate tube, and a generally vertical slot in the outer tube. Moreover, the outer tube includes pins which engage inside edges of the helical slot formed in the intermediate tube, so that vertical movement of the external float and the outer tube creates a camming action which causes rotation of the intermediate tube relative to the housing and the intake tube. This use of three tubes and three corresponding slots enables the apparatus to skim over a broader range of liquid levels. Thus, one skimmer design may be used with a variety of differently shaped skimming tanks.

The external surfaces of the intake tube and the intermediate tube each include an elongated groove. For the intake tube, which rotates relative to the intermediate tube in response to liquid level fluctuations in the housing, this groove creates a wiping action which minimizes build-up of dirt or other particulate between these two tubes. Moreover, the intermediate tube rotates relative to the housing in response to vertical movement of the outer tube, due to the camming action. As with the groove in the external surface of the intake tube, the groove in the external surface of the intermediate tube creates a similar wiping action which reduces the occurrence of particulate build-up.

Although the intake tube is rotatable relative to the housing, the intake tube does not rotate in response to movement of the intermediate tube or the outer tube. Rather, movement of a mechanical sensor, i.e., an internal float located within the housing, generates a mechanical signal which is coupled to the intake tube, so that the liquid level within the interior of the housing dictates the rotational position of the intake tube relative to the other portions of the intake structure.

A mechanical coupler interconnects the intake tube to the internal float, preferably outside of the housing and above the normal liquid level in the tank, adjacent a position where an upper end of the intake tube is secured to a physical support. By securing both ends of the intake tube for rotation with respect to the housing, the entire intake structure has enhanced durability. Additionally, an adjuster is included with the mechanical coupler which interconnects the internal float to the upper end of the intake structure, and the adjuster provides adjustable control over the starting position of the intake tube relative to the housing and the amount of rotation of the intake tube relative to the housing, in response to fluctuations in liquid level in the interior of the housing, thereby to obtain a wider or a narrower inlet, depending on the circumstances.

For example, applicant has learned that colder liquids have a tendency to be pumped more slowly and to be skimmed more slowly than warmer liquids. Therefore, for colder liquids the use of the adjuster enables the operator to reduce the rotation of the intake tube, thereby resulting in a relatively smaller increase in the size of the inlet upon sensing of a low liquid level in the housing. For warmer liquids, the adjustment mechanism can be set so that rotation of the intake structure during fluctuation of the internal float causes a greater variation in the size of the inlet. Again, as with the invention as set forth in applicant's '705 patent, the mechanical sensor, i.e., the internal float located inside the internal housing, operatively connects to the intake structure, specifically the intake tube, to cause rotation of the intake tube to vary the size of the inlet depending on the depth of the liquid in the housing, thereby to maintain a liquid level in the housing above the bottom end of the outlet tube. This adjustability feature of this invention provides a further degree of control for skimming liquids of different temperatures.

Preferably, the physical support to which the upper end of the intake tube is rotatably mounted also supports the upper end of a breather tube which provides an open passage from atmosphere to the inside of the submerged housing. Stated another way, applicant has learned that a breather tube of this type is helpful for enabling bubbles and/or entrapped air to exit the submerged housing via a route other than through the intake structure. Additionally, the breather tube includes a port adjacent an upper end thereof, to allow inflow of liquid to the housing in the event the liquid level in the tank becomes higher than its normal operating level, and above the level at which the intake structure can skim at a sufficient rate to keep sufficient liquid within the interior of the housing. Thus, this port and the breather tube help to assure that a sufficient liquid level is maintained within the submerged housing. As explained in the '705 patent, the relatively expensive pumps used for pumping liquid from a housing can be adversely effected if the liquid level is too low for an extended period of time, due to operation of the pump in a "dry" condition. In a sense, the breather tube provides a fail-safe feature for keeping sufficient liquid in the housing if the liquid level in the tank becomes too high. As disclosed in the '705 patent, separate structure provides a fail-safe feature for keeping sufficient liquid in the housing when the liquid level in the tank becomes unusually low. Additionally, the breather tube provides the physical support for an upper platform which rotatably holds an upper end of the intake tube.

Preferably, both the intake tube and the intermediate tube have one or more longitudinally extending external grooves formed in the external surface thereof. These grooves, in connection with rotational movement of the intake tube relative to the intermediate tube and the vertical movement of the outer tube relative to the intermediate tube, help to create a wiping action which minimizes the potential adverse effects of particulate matter within the liquid in the tank.

These and other features of the invention will be more readily understood in view of the following detailed description and the drawings.

DETAILED DESCRIPTION OF THE INVENTION

Figure 1:
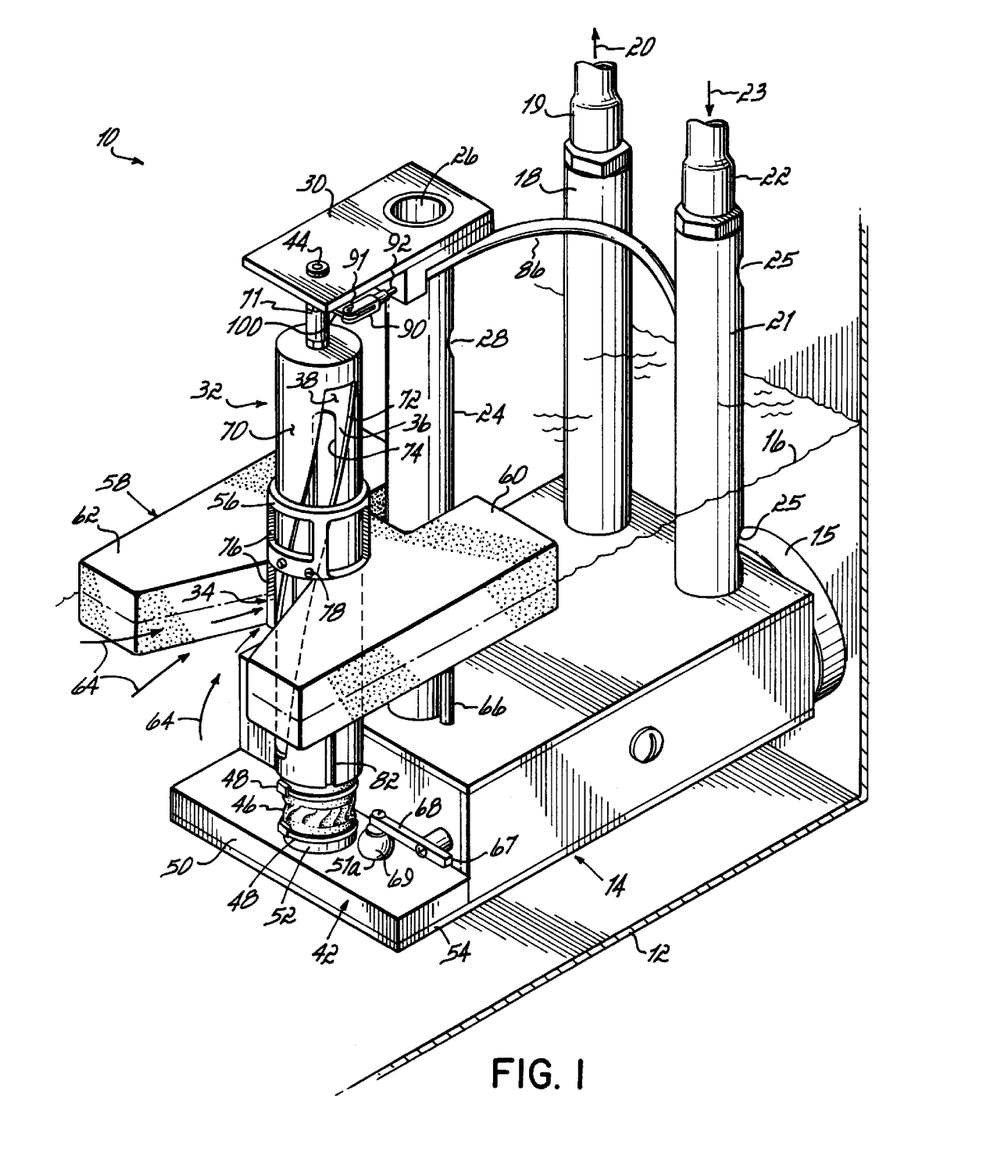
FIG. 1 is a perspective view of an improved skimming apparatus constructed in accordance with a first preferred embodiment of the invention.

FIG. 1 shows an improved skimming apparatus 10 constructed in accordance with a first preferred embodiment of the invention. The apparatus 10 is used in conjunction with a tank 12 which holds a liquid mixture of at least two components, such as coolant for a machine tool which inevitably will also include undesired tramp oil mixed therein.

As shown in the FIGS. 1–3C, the skimming apparatus 10 includes a housing 14 secured via a mount 15, in this case a magnetic mount, to a side wall of the tank 12 below the liquid level 16 for the tank 12. An outlet 18 connects to the housing 14, and is communication with the interior thereof. The outlet 18 connects to a hose 19 which conveys skimmed liquid upwardly from the apparatus 10, as shown by directional arrow 20, toward a coalescer (not shown) for further separation of the liquid into at least two components. In the case of an aqueous coolant used for machine tool, the separated coolant is returned to the tank 12, as shown by directional arrow 23, via a return line 22 which mounts to a return tube 21. Tube 21 is mounted to housing 14, but is not in fluid communication therewith. Rather, tube 21 includes one or more ports 25 through which the coolant returns to the tank 12.

At an opposite end of the housing 14, a support 24 extends upwardly therefrom. Preferably the support 24 is a breather tube with an open top end 26. The breather tube 24 is in fluid communication with the inside of the housing 14, thereby to vent the housing to open atmosphere to enable entrapped air and/or bubbles to escape therefrom. Additionally, the breather tube 24 includes a port 28 located above the normal liquid level 16 for the liquid in the tank 12. In the event of an unusually high liquid level 16, port 28 enables liquid to flow directly into the housing 14, thereby to prevent "dry running" of the pump used with the coalescer. Thus, the port 28 provides a fail-safe entrance for liquid into the housing 14 if the liquid level 16 in the tank 12 becomes unusually high, and sufficiently high that for one reason or another it is not flowing into the housing 14 via normal skimming operation. The breather tube 24 secures at its upper end to a horizontal platform 30.

The intake structure, designated generally by reference numeral 32, includes an inlet 34 which adjusts vertically with the liquid level 16 so that skimming of the liquid mixture occurs adjacent the upper surface thereof, i.e., at liquid level 16. The skimmed liquid enters the housing 14 via the intake structure 32. The intake structure 32 rotatably connects to the housing 14 at its top and bottom ends. More specifically, the intake structure 32 includes an intake tube 36 with an upper end 38 (FIG. 3B) rotatably connected to the platform 30 and a lower end 40 rotatably connected to a low profile adjacently situated portion 42 of the housing 14. The intake tube 36 is connected to the platform 30 via an elongated pin 44 (FIGS. 2 and 3B) so that it actually hangs from the platform 30, so as to be rotatable with respect thereto. At the lower end 40, the intake tube 36 connects to the adjacent portion 42 via a flexible joint 46, which is preferably an elastomeric sleeve which is held firmly on its opposite ends by upper and lower bands 48. Preferably, an upper plate 50 which defines the top piece of adjacent portion 42 includes an upwardly extending fitting 52. The bands 48 compress the ends of the sleeve 46, in a sandwiching arrangement, between the lower end 40 of the intake tube 36 and the fitting 52 of the top piece 50. The resilient nature of the elastomeric sleeve 46 enables the intake tube 36 to rotate relative to the housing, but prevents ingress of particulate.

Thus, the intake tube 36 is secured to the housing 14 at its upper 38 and lower 40 ends, and rotatable with respect to the housing 14 at both ends. This results in a more durable and longer lasting skimming apparatus 10. Moreover, because of the variation in the structure of the housing 14 of this improved skimming apparatus 10, i.e., the low profile portion 42, the intake structure 32 connects to the housing 14 external to the housing 14. This facilitates serviceability of the intake structure 32 should that become necessary. The inside of the adjacent portion 42 of the housing 14 has an opening 51 (FIGS. 2 and 3A) formed between the bottom surface of top piece 50 and the top surface of a bottom plate 54 of the housing 14, which resides in communication with the inside of the housing 14.

The rest of the intake structure 32 includes an outer tube 56 secured to an external float 58 which fluctuates in vertical position depending upon variations in the liquid level 16 of the liquid in the tank 12. At a first end 60 of the float 58, the float 58 partially encircles the breather tube 24. This helps to keep the float 58 aligned with respect to the housing 14 during vertical movement of the outer tube 56. At a second, opposite end 62, the float 58 defines a V-shape for directing the liquid mixture toward the inlet 34, as shown by directional arrows 64 (FIG. 1). Post 66 extends downwardly from the float 58. Upon downward movement of the float 58 as liquid level 16 lowers, post 66 contacts a first end 67 of a pivotal lever 68 to raise a plug 69 from a port 51a of opening 51 in top piece 50 in FIGS. 2 and 3A. This structure acts as a fail-safe measure for permitting liquid to flow directly into the housing 14 upon the occurrence of an unusually low liquid level 16. This feature is shown in applicant's prior patent, although with a somewhat different structure. With this skimmer 10, the port 51a is advantageously located at a lower level, below the top of housing 14 due to the low profile portion 42.

Figure 4A:
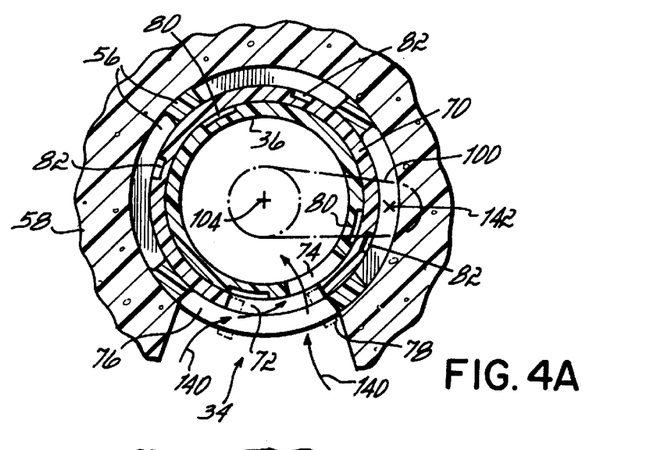
FIGS. 4A, 4B and 4C are cross-sectional views taken along lines 4A, 4B, and 4C from FIGS. 3A, 3B, and 3C, respectively, showing the relative positions of the intake tube, the intermediate tube, and the outer tube which define the inlet for the intake structure.
Figure 4B:
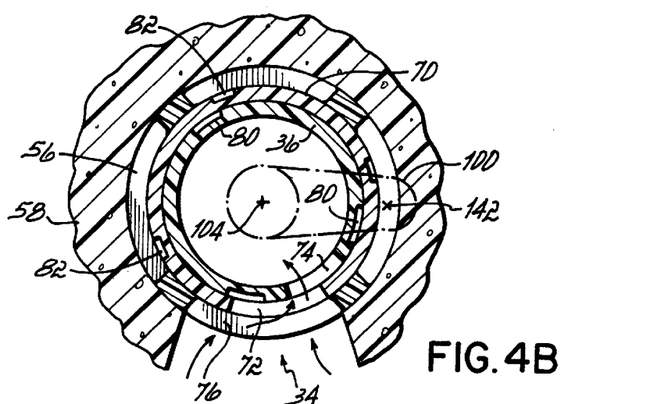

Between the outer tube 56 and the intake tube 36 resides an intermediate tube 70. A top end of intermediate tube 70 is enclosed, and hangs from support 30 via a sleeve 71, through which the pin 44 extends. The intermediate tube 70 includes an elongated helically shaped slot 72 which, when aligned with a slot 74 in the intake tube 36 and a slot 76 in the outer tube 56, defines the inlet 34 for the intake structure 32. A pair of spaced pins 78 extend through the outer tube 56 and engage inside edges of the helical slot 72, so that vertical movement of outer tube 56 and the external float 58 cause rotation of intermediate tube 70 relative to the intake tube 36 and the housing 14. Because the intermediate tube 70 rotates relative to the intake tube 36 and the outer tube 56 upon variation in the liquid level 16, and due to the shape of the slot 72 in the intermediate tube 70, the cross-sectional shape of the inlet 34 remains substantially the same despite variations in the liquid level 16 (FIGS. 4A and 4B). Due to the use of three tubes and three aligned slots, the apparatus 10 is capable of skimming over a wide range of liquid levels, to accommodate different tank designs.

Figure 4C:
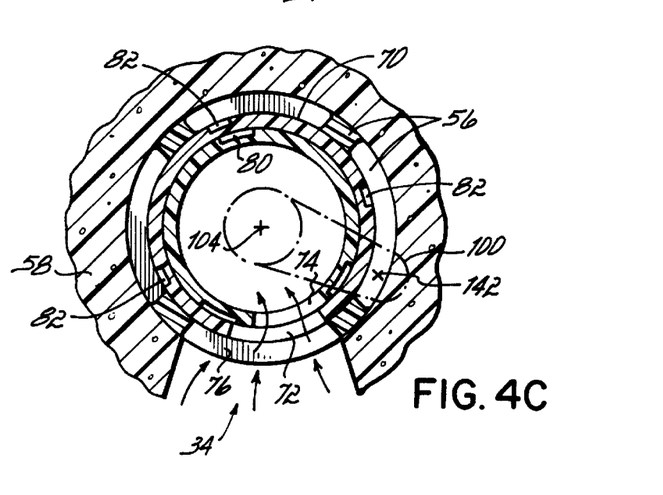

Preferably one or more elongated grooves 80 and 82 are formed in the outer surfaces of the intake tube 36 and the intermediate tube 70, respectively as shown in FIGS. 4A–4C. These grooves promote a wiping action during relative rotational movement of intake tube 36 with respect to intermediate tube 70 and during relative rotational movement of intermediate tube 70 with respect to outer tube 56, thereby minimizing potential adverse effects which could otherwise occur due to the accumulation of dirt and/or other particulate between these movable components of the intake structure 32. Preferably, there is only minimal contact between the intermediate tube 70 and the intake tube 36, to allow relatively free rotational movement of the intermediate tube 70 relative to the intake tube 36.

Rotational movement of the intake tube 36 relative to housing 14 and platform 30 occurs in response to fluctuations in the liquid level inside the housing 14. Such fluctuations in liquid level in the housing 14 are sensed in the housing 14 and conveyed to the intake tube 36 via a mechanical coupler 86 which preferably includes a movable inner tube 94 residing within a stationary external tube 96. At a first end 88 of the mechanical coupler 86, external of the housing 14, the mechanical coupler 86 is supported by the platform 30 and operatively connects to the elongated pin 44 which holds the upper end 38 of the intake tube 36. These features are shown more clearly in FIGS. 2 and 3A. The upper end 88 of the mechanical coupler 86 includes a yoke 90 secured to a wire 92 which secures to one end of the inner tube 94, which moves axially along an external tube 96. Movement of the internal tube 94 and the attached wire 92 and yoke 90 controls movement of an outer radial end of a lever 100 pivotally connected to the yoke 90 by a pin 91. The opposite, radially internal end of the lever 90 connects to the pin 44, thereby mechanically coupling linear movement of the yoke 90, as shown by directional arrows 102 (FIG. 2), to the lever 100 to cause rotational movement of pin 44. Rotation of pin 44 rotates the intake tube 36 about a rotational axis 104 with respect to the housing 14 and the platform 30. Rotational movement of intake tube 36 moves its corresponding elongated vertical slot 74 into alignment with slot 72 in the intermediate tube 70 and slot 76 in the outer tube 56, thereby defining the cross-sectional shape of the inlet 34. The inlet 34 is shown by the shaded region in FIG. 3A.

Preferably, the inner tube 94 is threadably received within the yoke 90, to allow the operator to set the initial starting position of the intake tube 36 relative to the outer tube 56. This also increases the operator's control over the inlet 34.

Figure 2:
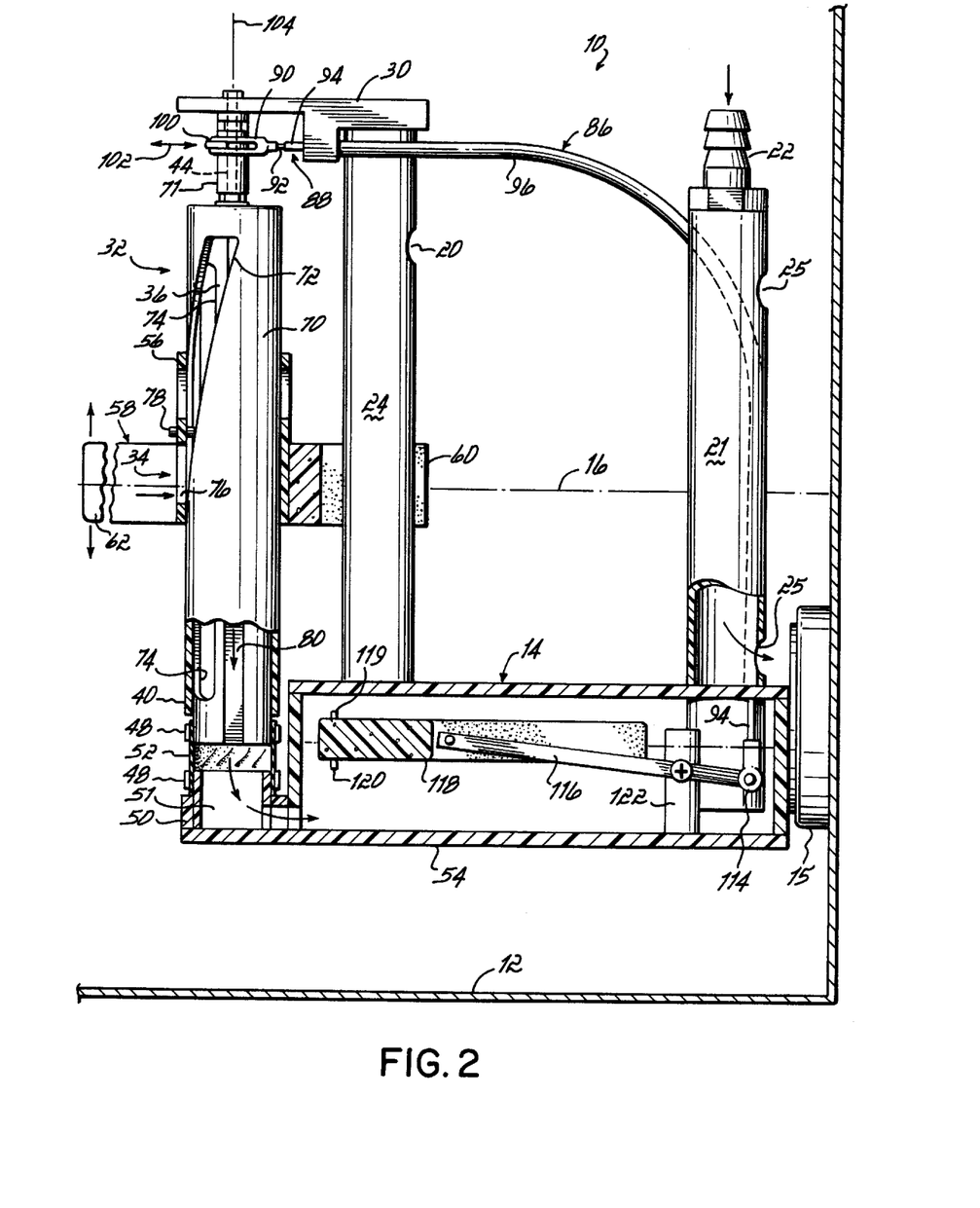
FIG. 2 is a longitudinal side view, in partial cross-section, of the improved skimming apparatus shown in FIG. 1.

With further reference to FIG. 2, the lower end of the mechanical coupler 86 extends into the housing 14, and a lower end of the internal tube 94 connects to a sleeve connector 114 which pivotally connects to one end of an internal lever 116. An opposite end of the internal lever 116 holds an internal float 118, which moves vertically within the housing 14 depending upon the liquid level therein. Preferably, the internal float 118 includes upper and lower spacers 119 and 120, respectively, to prevent the internal float 118 from sticking to the upper and lower inside surfaces, respectively, of the walls of the housing 14. The lever 116 pivotally mounts to a fulcrum 122 located inside the housing 14.

As the internal float 118 fluctuates in vertical position with the level of liquid in the tank 14, lever 116 pivots sleeve connector 114 and inner tube 94 in corresponding fashion. More specifically, when the liquid level raises and internal float 118 moves upwardly, inner tube 94 moves downwardly, thereby pulling yoke 90 and lever 100 to the right, as viewed in FIG. 2, to cause rotation of the intake tube 36 in a direction which reduces the cross-sectional area of the inlet 34. Correspondingly, as internal float 118 moves downwardly with a receding liquid level in the housing 14, the sleeve connector 114 moves upwardly thereby causing yoke 90 to move to the left, as viewed in FIG. 2, thereby pivoting lever 100 to rotate the intake tube 36 in a direction which increases the cross-sectional area of the inlet 34.

Thus, like the skimming apparatus shown in applicant's '705 patent, the present skimming apparatus 10 has an internal float 118 which senses the liquid level in the housing 14 and that sensed level is operatively conveyed to the intake structure 32 to cause a corresponding increase or decrease in the cross-sectional size of the inlet 34, so that an increase in the level of liquid in the housing 14 results in a reduction in the size of the inlet 34 and a decrease in the liquid level in the housing 14 results in an increase in the size of the inlet 34. However, with the improved skimming apparatus 10 of the present invention, rotational movement of the structure which varies the size of the inlet 34 is coupled to this mechanical sensor above the liquid level 16 of the liquid in the tank 12. Again, this feature improves serviceability.

Figure 3A:
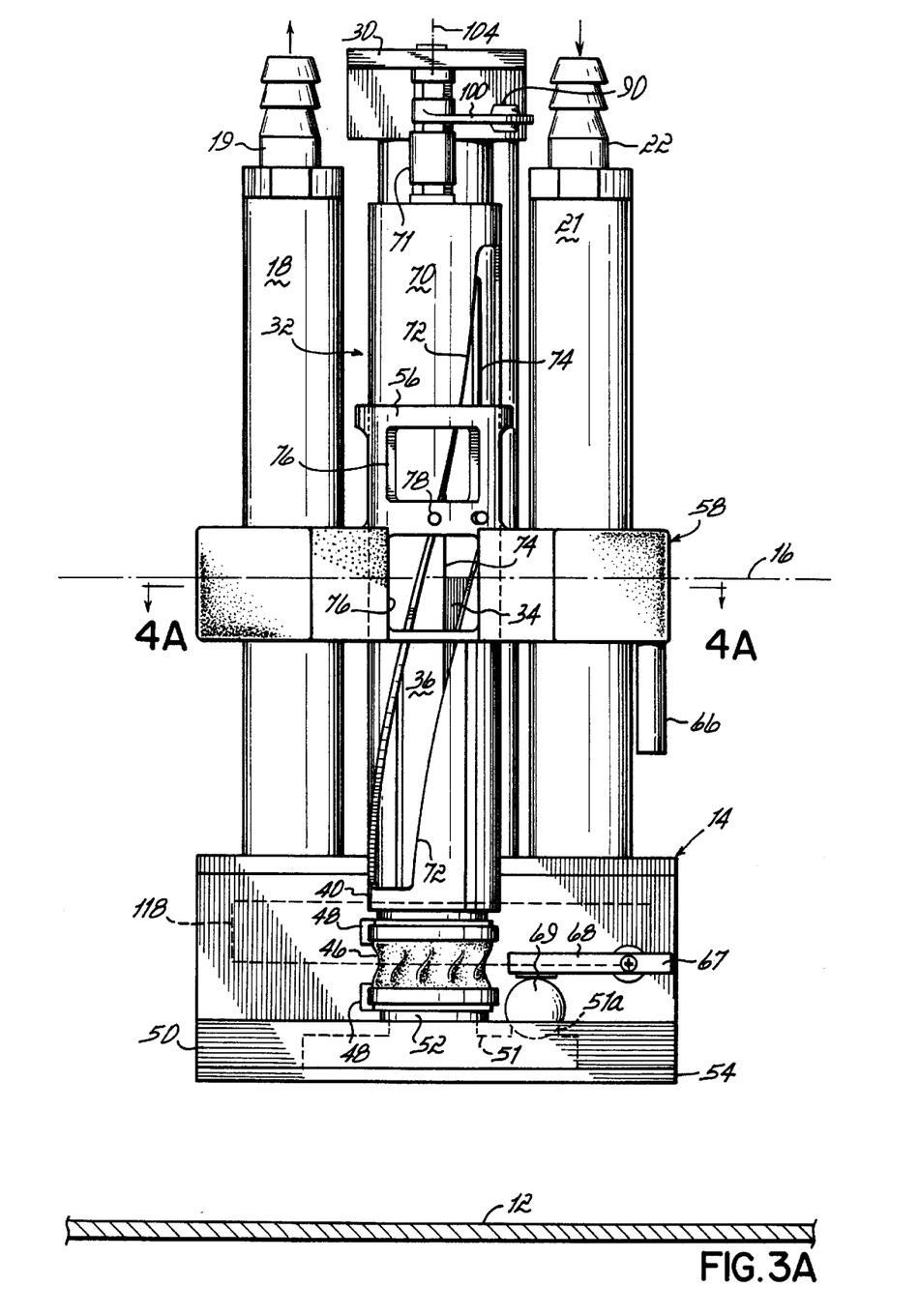
FIG. 3A is a front view of the improved skimming apparatus shown in FIG. 1, with the external float at a first vertical level.
Figure 3B:
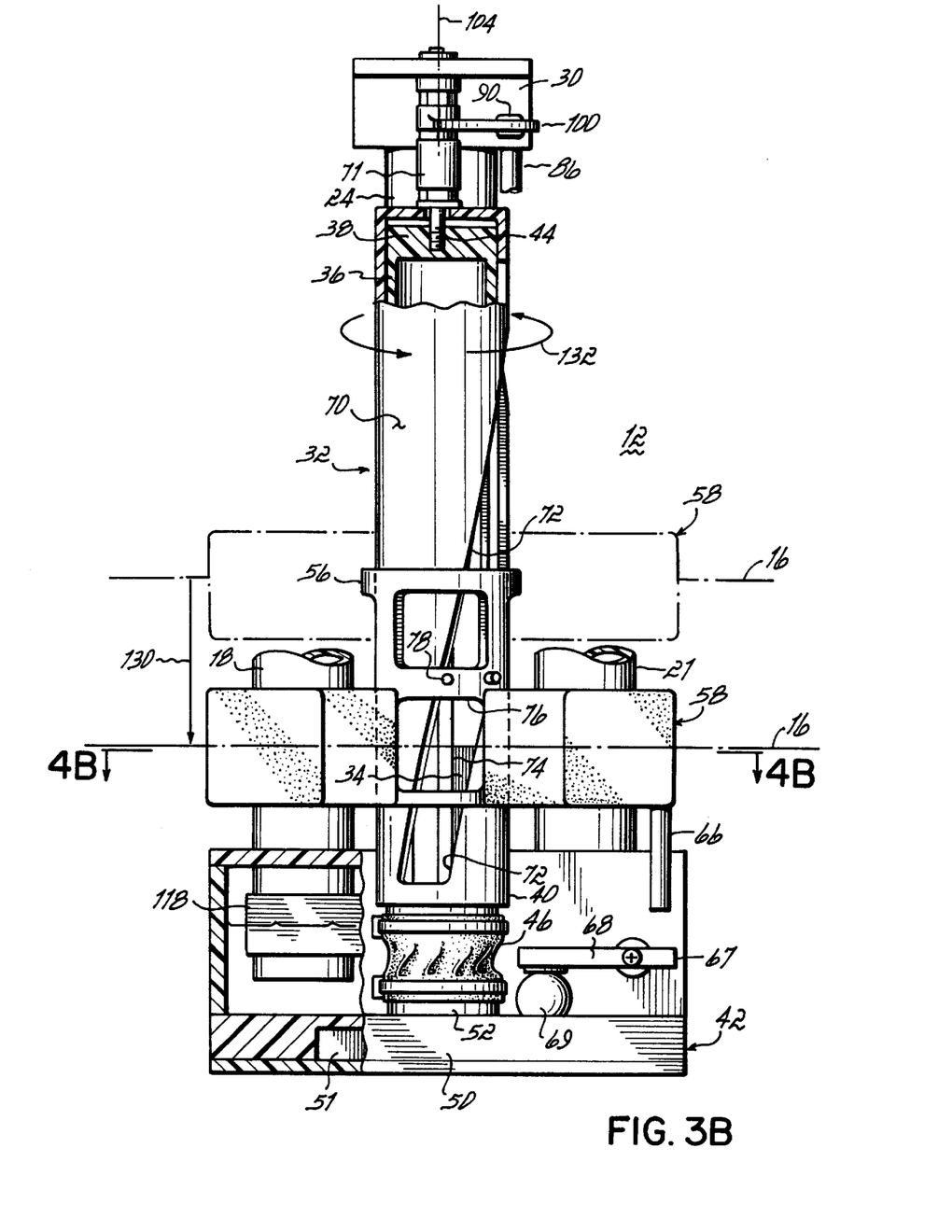
FIG. 3B is a view similar to 3A in partial cross-section but with the float and the outer tube shown at a second, lower vertical level.

FIG. 3A shows the inlet 34 in greater detail, as a shaded region defined by aligned portions of slot 74 in intake tube 36, helical slot 72 in intermediate tube 70 and slot 76 in outer tube 56. FIG. 3B shows a situation identical in all respects as the fluid situation shown in FIG. 3A, except that liquid level 16 has receded to a lower level within the tank 12. During downward movement of the external float 58 and the outer tube 56, as shown by directional arrow 130, the pins 78 engage the inside edges of the slot 72 in the intermediate tube 70, thereby causing rotation of intermediate tube 70 about axis 104, as shown by directional arrows 132. The slot 76 in the outer tube 56 and the slot 74 in the intake tube 36 remain oriented in the same angular position relative to the housing 14. Thus, the inlet 34 appears in the same relative position with respect to the outer tube 56 and has the same cross-sectional shape, despite being at a lower vertical level. A different portion of the slot 72 in intermediate tube 70 now forms part of the inlet 34, but as viewed from level 16 that portion has the same shape as the portion which formed part of the inlet 34 in the condition shown in FIG. 3A.

Figure 3C:
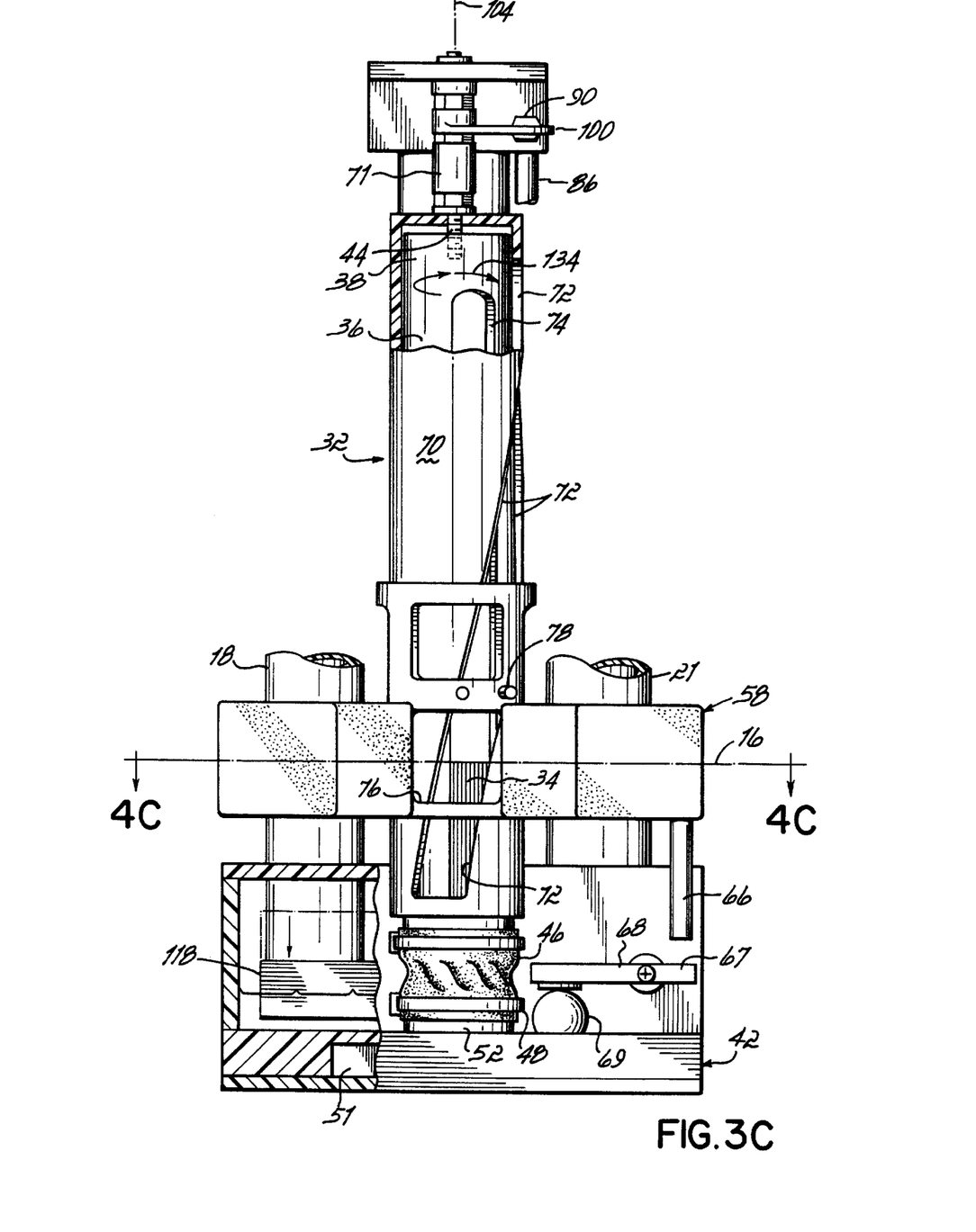
FIG. 3C is a view similar to 3B, and with the external float and outer tube at the same vertical level as shown in FIG. 3B, but with the intake tube rotated relative to the housing and the rest of the intake structure.

FIG. 3C shows the same liquid level 16 as shown in FIG. 3B, but in this case the intake tube 36 has been rotated about axis 104 in the direction shown by directional arrows 134, and opposite the direction of directional arrows 132, thereby increasing the size of the inlet 34 by bringing more of the slot 74 into alignment with the slot 72 in the intermediate tube 70 and the slot 76 in the outer tube 56. Thus, FIG. 3C reflects a condition wherein inlet 34 has increased in size to reflect a sensed lowering of the liquid level in the housing 14, or at least a liquid level receding from the level which caused the situations shown in FIGS. 3A and 3B.

FIGS. 4A, 4B and 4C are transverse cross-sectional views taken along corresponding cross-sectional lines 4A—4A, 4B—4B and 4C—4C of FIGS. 3A, 3B and 3C, respectively, which show the relative positions of the components of the intake structure 32 for the situations depicted in FIGS. 3A, 3B and 3C. In FIG. 4A, directional arrows 140 show the flow of liquid into the inlet 34 of the intake structure 32 through slots 76, 72 and 74, of the outer tube 56, the intermediate tube 70 and the intake tube 36, respectively. In this condition, the lever 100 is in a "3 o'clock" position. FIG. 4B is identical to FIG. 4A, because as noted above the relative positions of the intake tube 36, the intermediate tube 70 and the outer tube 56 are identical. Again, even though intermediate tube 70 has rotated, the slot 72 in FIG. 4B looks identical to the slot 72 in FIG. 3A when viewed in cross section at the liquid level 16. Thus, for FIG. 4B inflow conditions through the inlet 34 are identical to those depicted in FIG. 4A, but at a lower level 16. In contrast, in FIG. 4C the lever 100 has been moved clockwise to a position best described as "almost 4 o'clock." This movement of lever 100 corresponds to rotation of intake tube 36 clockwise relative to the intermediate tube 70 and the outer tube 56 (as viewed in FIGS. 4A, 4B and 4C), thereby bringing more of slot 74 into alignment with slots 76 and 72 and increasing the size of the inlet 34 to increase the rate of inflow to the housing 14.

In each of FIGS. 4A, 4B and 4C, the pivotal connection point between the lever 100 and yoke 90 is designated by an "X," indicated by reference numeral 142. This represents the position where the pin 91 extends through a corresponding hole in the outer end of the lever 100 to secure the lever 100 to upper and lower legs of the yoke 90. Preferably, the lever 100 includes one or more additional holes located radially inside and outside of the X point shown by reference numeral 142. This enables the yoke 90 to be connected to the lever 100 either closer to or further away from the axis 104, thereby to enable an operator to adjustably control the linear stroke generated by the mechanical coupler 86 in response to vertical fluctuations of the internal float. The linear stroke distance is best exemplified by directional arrows 102 in FIG. 2. By providing this degree of adjustability, this skimming apparatus 10 enables the operator to increase or decrease the rotational movement of the intake tube 36 in response to vertical fluctuations of the internal float 118. This feature is advantageous for the operator when dealing with liquids of varying temperature. Since warmer liquids tend to skim faster and pump faster than colder liquids, the skimming apparatus 10 of this invention provides a degree of adjustability to accommodate the need for different response times. For instance, for a warmer liquid, by using the radially outermost connection point 142 for the lever 100, upon sensing of a lowering of the liquid level in the tank 14 via movement of the internal float 118, this apparatus 10 will generate maximum rotational movement of the intake tube 36 to obtain the maximal increase in the size of the inlet 34, compared to a relatively slower intake capacity needed for a colder liquid where skimming and pumping occur more slowly.

While these and other features of an improved skimming apparatus 10 in accordance with a preferred embodiment of the inventions have been described, it is to be understood that the invention is not limited thereby and in light of the present disclosure, various other alternative embodiments will be apparent to one of ordinary skill in the art without departing from the scope of the invention. For instance, the invention has been described with respect to use in conjunction with a machine tool, for skimming and separating tramp oil from aqueous coolant. As noted at the outset, this same structure and operation may also be used in conjunction with a parts washer. Accordingly, applicant intends to be bound only by the following claims.

I claim:

1. A skimming apparatus for skimming liquid adjacent the surface of a volume of liquid contained in a tank, the apparatus comprising:

a substantially enclosed housing having an exterior and an interior and adapted to be mounted within the tank at a vertical position below a normal operating level for the liquid in the tank;

an outlet tube secured to the housing and having a bottom end extending into the housing, the outlet tube adapted to convey liquid outwardly from the housing via the bottom end;

an intake tube secured to the housing so as to be rotatable with respect thereto, the intake tube having a lower end in fluid communication with the interior of the housing and an upper end extending above the housing, the intake tube further having an elongated slot extending substantially along the length thereof;

an outer sleeve telescopingly received over the intake tube, the outer sleeve having an outer opening at least partially aligned with the slot, whereby aligned portions of the opening and the slot define an inlet for liquid in the tank to flow into the intake tube and then to the interior of the housing;

a first float disposed within the interior of the housing and vertically movable depending on the liquid level therein, the float being operatively connected to the intake tube such that vertical movement of the float causes rotational movement of the intake tube with respect to the outer sleeve thereby varying the size of the inlet; and a flexible joint connecting the lower end of the intake tube to the housing, the joint permitting rotation of the intake tube with respect to the housing while maintaining a substantially fluid tight connection therebetween.

2. The skimming apparatus of claim 1 wherein the housing includes an intake section located adjacent to a main section, the intake section defined by an upper piece having an opening therein and a fitting surrounding said opening, the joint interconnecting the lower end of the intake tube to the fitting.

3. The skimming apparatus of claim 2 wherein the flexible joint further comprises:

an elastomeric sleeve secured to the lower end of the intake tube and the fitting by upper and lower tightenable bands, respectively.

4. A skimming apparatus for skimming liquid adjacent the surface of a volume of liquid contained in a tank, the apparatus comprising:

a substantially enclosed housing having an exterior and an interior and adapted to be mounted within the tank at a vertical position below a normal operating level for the liquid in the tank;

an outlet tube secured to the housing and having a bottom end extending into the housing, the outlet tube adapted to convey liquid outwardly from the housing via the bottom end;

an intake structure secured to the housing, the intake structure having an upper end which floatably adjusts with respect to the level of the liquid in the tank to gravitationally convey liquid into the housing via an inlet located adjacent the upper end;

a mechanical sensor located in the housing and operatively connected to the intake structure to vary the size of the inlet depending on the depth of liquid in the housing, thereby to maintain a liquid level in the housing above the bottom end of the outlet tube; and wherein the inlet of the intake structure is defined by aligned portions of: a first slot in an intake tube, a second slot in an intermediate tube and a third slot in an outer tube, the outer tube being movable vertically with respect to the intake tube and the intermediate tube.

5. The skimming apparatus of claim 4 wherein:

the intake tube is mounted to the housing to be rotatable with respect thereto, and operatively connected to the mechanical sensor so as to rotate with respect to the housing in response to changes in the depth of the liquid in the housing;

the second slot in the intermediate tube is oriented helically around a portion of the intermediate tube and the intermediate tube is adapted to be rotatable with respect to the intake tube; and the outer tube includes at least one cam follower which cooperates with the second slot, thereby to rotate the intermediate tube in response to vertical movement of the outer tube relative to the housing; and an external float connected to the outer tube and adapted to move vertically with respect to the housing in response to fluctuations in the liquid level of the tank, thereby to vertically adjust the vertical position of the inlet with respect to the liquid level in the tank, to maintain the inlet adjacent the surface of the liquid in the tank regardless of variations of the liquid level in the tank.

6. The skimming apparatus of claim 5 wherein the second slot of the intermediate tube is shaped such that the cross sectional shape of the inlet remains substantially the same despite vertical movement of the outer tube and the external float.

7. The skimming apparatus of claim 6 wherein the at least one cam follower includes a pair of spaced pins mounted to the outer tube, the pins engaging inside edges of the second slot, whereby interaction of the pins with the inside edges produces a camming rotation of the intermediate tube relative to the intake tube upon vertical movement of the outer tube relative to the housing.

8. The skimming apparatus of claim 5 wherein at least one of the intake tube and the intermediate tube includes an elongated groove in an external surface thereof, to generate a wiping action in response to rotational movement, thereby to wipe the external surface and to minimize the potential adverse effects of particulate in the liquid.

9. A skimming apparatus for skimming a liquid mixture of at least two liquid components from a tank containing the mixture, comprising:

a bracket;

a substantially enclosed housing mounted to the bracket to locate the housing in the tank at a vertical position below a normal operating level for the liquid mixture contained therein;

an outlet tube secured to the housing and having a bottom end extending into the housing, the outlet tube adapted to convey liquid outwardly from the housing via the bottom end;

an intake structure secured to the housing, the intake structure having an upper end which floatably adjusts with respect to the level of the liquid mixture in the tank to gravitationally convey liquid into the housing via an inlet located adjacent the upper end;

a mechanical sensor located in the housing and operatively connected to the intake structure to vary the size of the inlet depending on the depth of liquid in the housing, thereby to maintain a liquid level in the housing above the bottom end of the outlet tube; and a breather tube secured to the housing, the breather tube including an open upper end extending above the housing and above the normal liquid level in the tank and a lower end secured so as to be in open fluid communication with the interior of the housing, whereby foam and entrapped air inside the housing can flow upwardly to atmosphere through the breather tube.

10. The skimming apparatus of claim 9 and further comprising:

a platform mounted to the upper end of the breather tube;

the intake structure including an intake tube secured to the housing so as to be rotatable with respect to the housing, the intake tube including upper and lower ends, the upper end of the intake structure being rotatably mounted to the platform.

11. The skimming apparatus of claim 10 wherein the mechanical sensor operatively connects to the upper end of the intake tube, adjacent the platform.

12. The skimming apparatus of claim 9 wherein the breather tube includes a port hole adjacent the upper end thereof, above the normal operating level for liquid in the tank, thereby to permit fluid flow into the housing upon occurrence of an unusually high liquid level in the tank.

13. A skimming apparatus for skimming a liquid mixture of at least two liquid components from a tank containing the mixture, comprising:

a bracket;

a substantially enclosed housing mounted to the bracket to locate the housing in the tank at a vertical position below a normal operating level for the liquid mixture contained therein;

an outlet tube secured to the housing and having a bottom end extending into the housing, the outlet tube adapted to convey liquid outwardly from the housing via the bottom end;

an intake structure secured to the housing, the intake structure having an upper end which floatably adjusts with respect to the level of the liquid mixture in the tank to gravitationally convey liquid into the housing via an inlet located adjacent the upper end;

a mechanical sensor located in the housing and operatively connected to the intake structure to vary the size of the inlet depending on the depth of liquid in the housing, thereby to maintain a liquid level in the housing above the bottom end of the outlet tube;

a support extending upwardly from the housing;

the intake structure including an intake tube, the intake tube having a lower end rotatably mounted to the housing and an upper end rotatably mounted to the support, the intake structure further including an outer tube and a float secured thereto, each of the intake tube and the outer tube having a slot formed therein, wherein aligned portions of the slots define the inlet, the float adapted to move vertically with respect to the housing in response to the liquid level of the tank, thereby to vertically adjust the vertical position of the inlet with respect to the liquid level in the tank, thereby to maintain the inlet adjacent the surface of the liquid in the tank regardless of variations of the liquid level in the tank.

14. The skimming apparatus of claim 13 wherein the float is shaped so as to partially encircle the support, thereby to guide the float during vertical movement relative to the housing.

15. The skimming apparatus of claim 14 wherein the support further comprises a breather tube in open fluid communication with the interior of the housing, thereby to vent the submerged housing, and a platform located at a top end of the support.

16. The skimming apparatus of claim 13 and further comprising:

a mechanical coupler for operatively connecting the mechanical sensor to the intake tube, the mechanical coupler connected to the intake tube outside of the housing and adjacent an upper end of the intake tube, the coupler including an adjuster for controlling the variation in the size of the inlet depending upon the temperature of the liquid in the tank.

17. A skimming apparatus for skimming a liquid mixture of at least two liquid components from a tank containing the mixture, comprising:

a bracket;

a substantially enclosed housing mounted to the bracket to locate the housing in the tank at a vertical position below a normal operating level for the liquid mixture contained therein;

an outlet tube secured to the housing and having a bottom end extending into the housing, the outlet tube adapted to convey liquid outwardly from the housing via the bottom end;

an intake structure secured to the housing, the intake structure having an upper end which floatably adjusts with respect to the level of the liquid mixture in the tank to gravitationally convey liquid into the housing via an inlet located adjacent the upper end;

a mechanical sensor located in the housing and operatively connected to the intake structure to vary the size of the inlet depending on the depth of liquid in the housing, thereby to maintain a liquid level in the housing above the bottom end of the outlet tube; and a mechanical coupler for operatively interconnecting the mechanical sensor to the intake structure, the mechanical coupler including an adjuster for controlling the variation in the size of the inlet depending upon the temperature of the liquid in the tank.

* * * * *